United States Patent [19]

Bardroff

[11] Patent Number: 6,099,453
[45] Date of Patent: Aug. 8, 2000

[54] PROCESS AND APPARATUS FOR FOLDING AN AIR BAG IN A SPIRAL SHAPE

[75] Inventor: Hans Bardroff, Hohenroth, Germany

[73] Assignee: PREH-Werke GmbH & Co. KG, Bad Neustadt/Saale, Germany

[21] Appl. No.: 08/993,872

[22] Filed: Dec. 18, 1997

[30] Foreign Application Priority Data

Jan. 10, 1997 [DE] Germany ............... 197 00 433

[51] Int. Cl.$^7$ ............... B31B 1/44; B31B 1/52
[52] U.S. Cl. ............... 493/456; 493/457; 493/250
[58] Field of Search ............... 493/447, 456, 493/448, 449, 455, 457, 446, 250, 405; 280/728.1, 743.1

[56] References Cited

U.S. PATENT DOCUMENTS

| | | | |
|---|---|---|---|
| 2,538,671 | 1/1951 | Crowe | 493/447 |
| 2,697,970 | 12/1954 | Tipper | 493/448 |
| 4,659,323 | 4/1987 | Ito et al. | 493/457 |
| 4,834,700 | 5/1989 | Kondo et al. | 493/456 |
| 5,803,892 | 9/1998 | Marotzke | 493/451 |

FOREIGN PATENT DOCUMENTS

| | | |
|---|---|---|
| 2 251 493 | 5/1973 | Germany . |
| 44 22 276 A1 | 12/1994 | Germany . |
| 195 16 264C1 | 5/1996 | Germany . |
| 195 16 494C1 | 10/1996 | Germany . |
| 195 35 564A1 | 3/1997 | Germany . |
| 196 25 109 | 12/1997 | Germany . |
| 2 315 050 | 1/1998 | United Kingdom . |
| WO 9748580 | 12/1997 | WIPO . |

OTHER PUBLICATIONS

Patent Abstracts of Japan, vol. 96, No. 10, Oct. 31, 1996 and JP 08 142790A (Toyota), Jun. 4, 1996.

Patent Abstracts of Japan, vol. 18, No. 653, Dec. 12, 1994 and JP 06 255437, (Takata), Sep. 13, 1994.

*Primary Examiner*—Brian L. Johnson
*Assistant Examiner*—Matthew Luby
*Attorney, Agent, or Firm*—Birch, Stewart, Kolasch & Birch, LLP

[57] ABSTRACT

In a process and an apparatus for folding a gas bag 15 for a passenger restraint system, a gas bag (15) is introduced, in an uninflated state, to an apparatus that includes a folding tool (12), folding aids (16) and a clamp (19). The folding tool (12) includes a holding plate (1), an intermediate plate (4) with a spiral strip (8) thereon, and a form plate (5) with a spiral slot 10 to accept the spiral strip 8. Prior to a folding process, the gas bag (15) lies on the spiral strip (8), which protrudes through the form plate (5). With help from the folding aids (16), the gas bag is folded into a free space between the protruding strip 8 and the intermediate plate (4). In the process, the gas bag (15) is pressed, as two plies, in spiral shape along the strip (8). The folding occurs uniformly from an inside to an outside. Using a clamp (19), the folded gas bag (15) is brought to a required shape for a housing (25) of the passenger restraint system.

8 Claims, 5 Drawing Sheets

PROCESS AND APPARATUS FOR FOLDING AN AIR BAG IN A SPIRAL SHAPE

BACKGROUND OF THE INVENTION

This invention relates to an inflatable air or gas bag for use as a component of a passenger restraint system, especially in motor vehicles, a process for folding the inflatable gas bag to a prescribed shape and volume by introducing it into a folding tool in an uninflated collapsed state, as well as to an apparatus for performing the process, including a folding tool as a receiving station for the gas bag.

German patent document (DE-44 22 276) discloses an air bag, a process for its folding, and an apparatus for implementing the folding process. In this disclosure, a main purpose, among other things, is to fashion the air bag so that it can deploy very quickly and without impediment, and, if possible, in all directions simultaneously. To this end, the air bag possesses main and secondary fold lines. Emanating from an imaginary center of a fully deployed air bag, there is a type of concentric zig-zag or accordion folding. This alternating folding is accomplished with aid of dish-like elements having cylindrical walls that inter-engage into one another, with varying diameters for the dish-like elements that lie opposite one another. Radially-acting folding elements, as grasping elements which are arranged in oppositely positioned pairs, are caused, one after the other, to move radially inwardly and press together. In this process, the next outer folding element is removed as the grasping elements proceed further inwardly. In a last step, the grasping apparatus is moved, together with the air bag, into a packing apparatus.

In the German patent document DE-195 16 264 C1, a grasping apparatus is disclosed in which ends of grasping elements are slit and guided in such a manner that they cross each other at their ends. These ends protrude farther if the grasping elements are moved farther into one another.

German patent document DE-195 35 564 A1 discloses a process and an apparatus for folding an gas/air bag for an air bag module. In the process, folding is accomplished by sucking the air bag from an upper or lower portion of a folding tool. No so-called folding elements are provided. A grasping element is a tightening strip that is pulled by a pressure cylinder with aid of deflection rollers, with the tightening strip being supported by gripping jaws which also change their positions until they abut adjustable contact base plates.

An additional process of this type is disclosed in German patent document DE-195 16 494 C1. In this case, a gas bag is brought into its in-use form prior to folding, that is, it is inflated, so that a base fabric area of the gas bag is arranged upon a working platform and another fabric surface is convexly curved. In this state, mechanical folding aids engage the gas bag and fold it, single ply. This process is too expensive and difficult to control in an automated process of folding, because a continual introduction/escape of gas must be assured, on the one hand, or, additional apparatus that hold the gas bag in its deployed form during folding, must be coordinated with the folding aids.

It is an object of this invention to provide a gas bag, as well as an effective process, for automated folding, and an apparatus therefor.

SUMMARY OF THE INVENTION

According to principles of this invention, a gas bag has a spiral fold shape.

In a process for folding an inflatable gas bag of this invention, the gas bag is introduced into a folding tool in an uninflated state. The gas bag is collapsed to a prescribed shape in a space-saving manner to have a prescribed volume, so that lower and upper fabric layers lie approximately in a horizontal plane to be folded together in two plies, and subsequently clamped. The gas bag is fixed at its center and, emanating from an imaginary center, progressing spirally, is folded, so that there are alternating areas between fold lines which extend perpendicular to the horizontal plane, toward an outer edge of the gas bag. Thereafter, the folded gas bag is clamped concentrically in the horizontal plane.

An apparatus for performing the process, which includes a folding tool, is an acceptance station for the gas bag. The folding tool has a spiral strip which defines a spiral-shaped free space between windings folding aids, 16, grips into the spiral free space.

BRIEF DESCRIPTION OF THE DRAWINGS

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of the invention, as illustrated in the accompanying drawings in which reference characters refer to the same parts throughout the different views. The drawings are not necessarily to scale, emphasis instead being placed upon illustrating the principles of the invention in a clear manner.

DESCRIPTION OF THE PREFERRED EMBODIMENT

Figure 1:
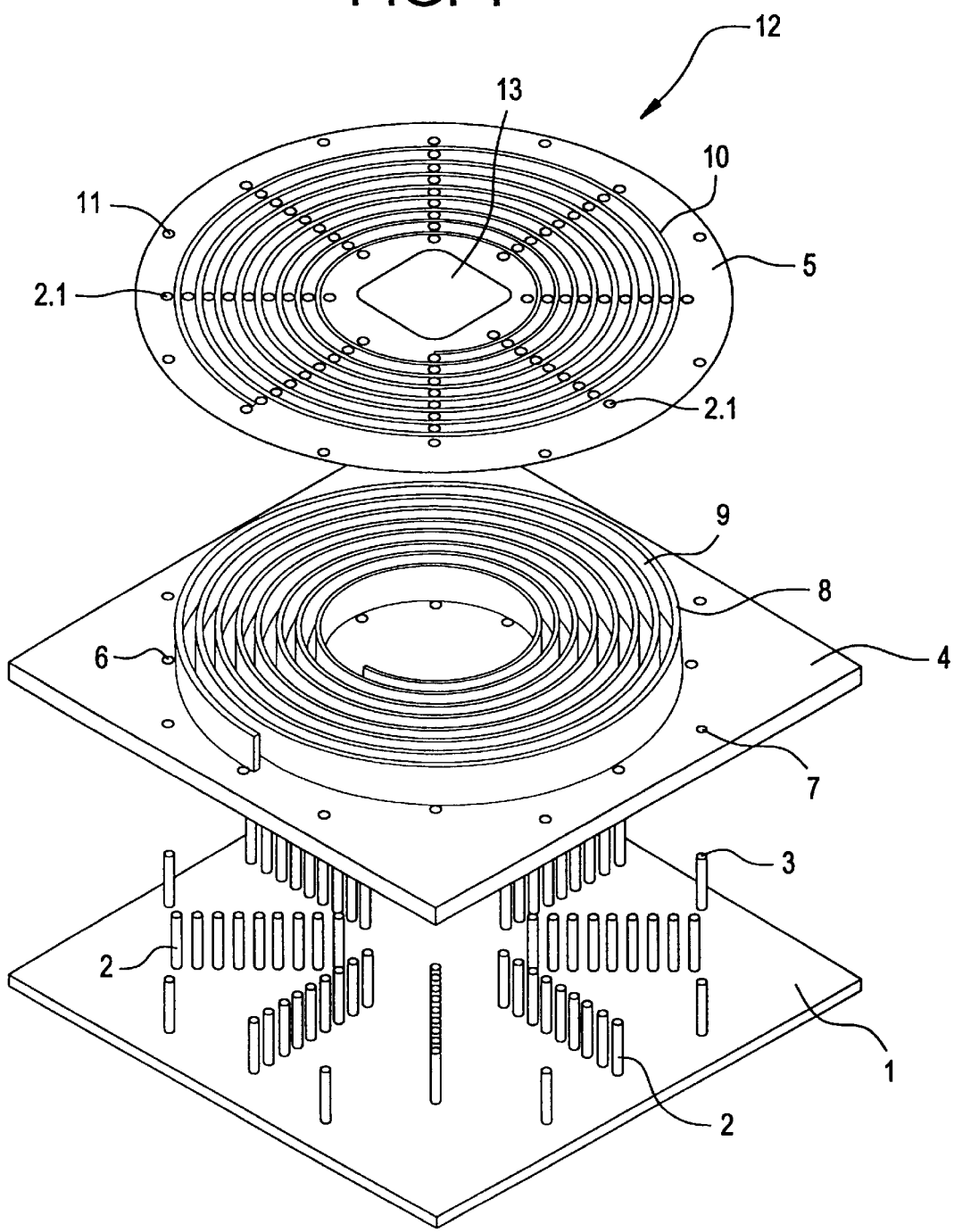
FIG. 1 is an exploded perspective-view schematically showing salient features of a folding tool of this invention.

FIG. 1 shows a holding plate 1 with holding pins 2 attached thereto, perpendicular to the holding plate's surface. Additional attachment pins 3 serve to subsequently orient an intermediate plate 4 and a form plate 5 relative to one another. The separate intermediate plate 4 has round perforations 6 which are positioned the same as the holding pins 2 for receiving the holding pins 2, as well as perforations 7 to accept attachment pins 3. An edge of a strip 8, which strip extends spirally from radially inside to outside, is attached to the intermediate plate 4. A path of the spiral strip 8 is coordinated with positions of the perforations 6.

That is, the perforations 6 lie in a spiral free space 9 which is located between individual spiral arcs, or windings, of the strip 8. The form plate 5 has a spiral slot 10 through which the spiral strip 8 can pass. Perforations 11 are located at an outer edge for accepting the attachment pins 3 of holding plate 1. Together, the aforementioned elements constitute a folding tool 12 which is integrated into a machine (receiving station) that is not represented in greater detail. To enhance stability of the folding tool 12, the form plate 5 defines, preferably, perforations 2.1 which are spaced the same as the perforations 6 of intermediate plate 4. At the middle of form plate 5, there is a recess 13 to accept a gas generator 14 (see FIG. 2).

Figure 2:
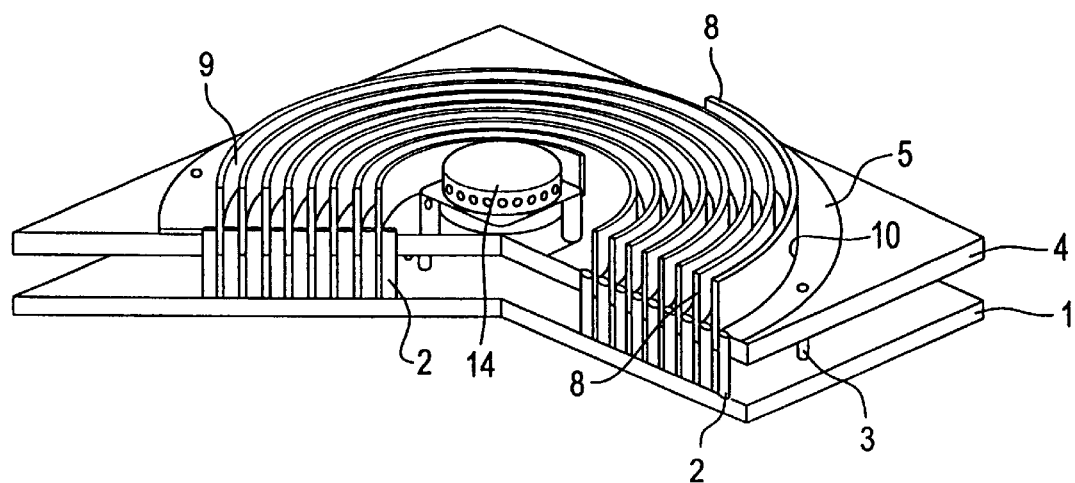
FIG. 2 is a perspective cutaway representation of the folding tool of FIG. 1 in a working position.

An interaction of the individual parts of the folding tool 12 can be recognized in FIG. 2. A gas bag 15 is folded up when the folding tool 12 is in this position (see also FIG. 6).

Figure 3:
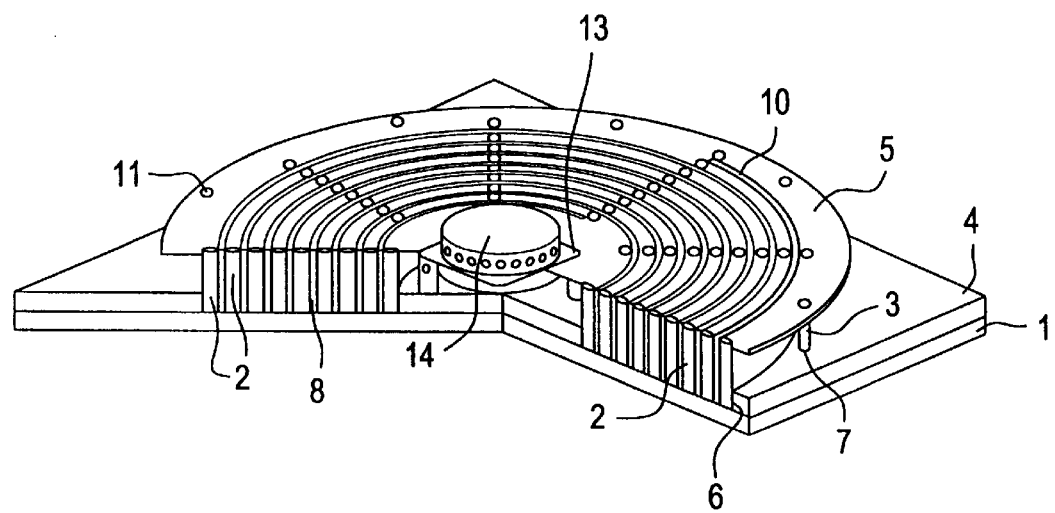
FIG. 3 is a perspective cutaway representation of the folding tool of FIG. 1 in a removal position.

In FIG. 3, the folding tool 12 assumes a position for removing the folded gas bag 15.

Figure 4:
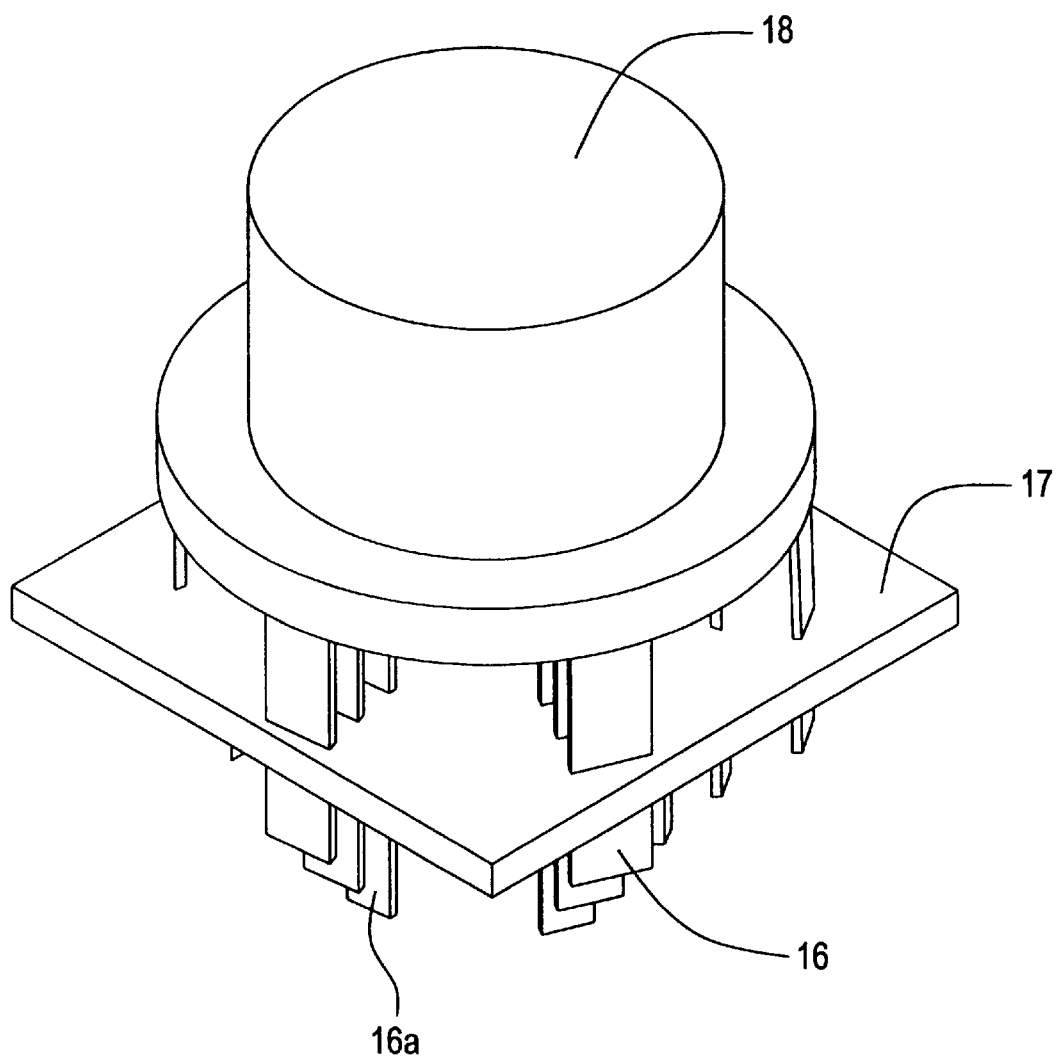
FIG. 4 is a perspective representation of a folding aid for use with the folding tool of FIG. 1.

In FIG. 4, folding aids 16, which protrude through a plate 17 and are supported by a housing 18, are shown. In this case, the plate 17 has the task of keeping the folding aids 16 at defined distances with respect to one another.

Figure 5:
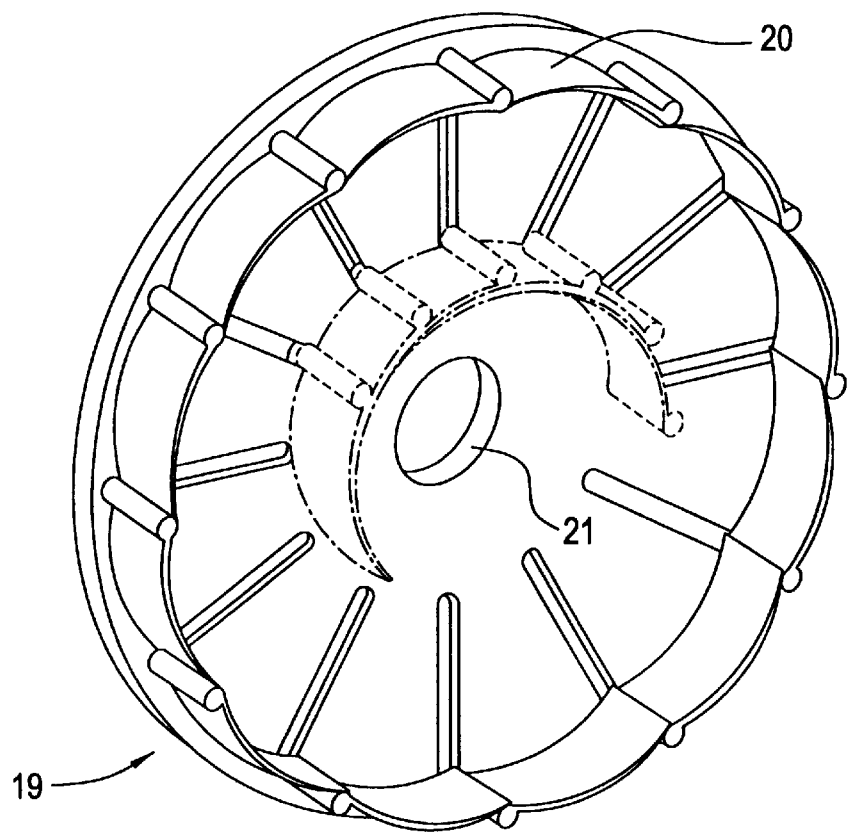
FIG. 5 is a perspective representation of a clamping apparatus for use with the folding tool of FIG. 1, FIG. 5a, is a perspective representation of an opposite side of clamping apparatus of FIG. 5 during a clamping operation.
Figure 5A:
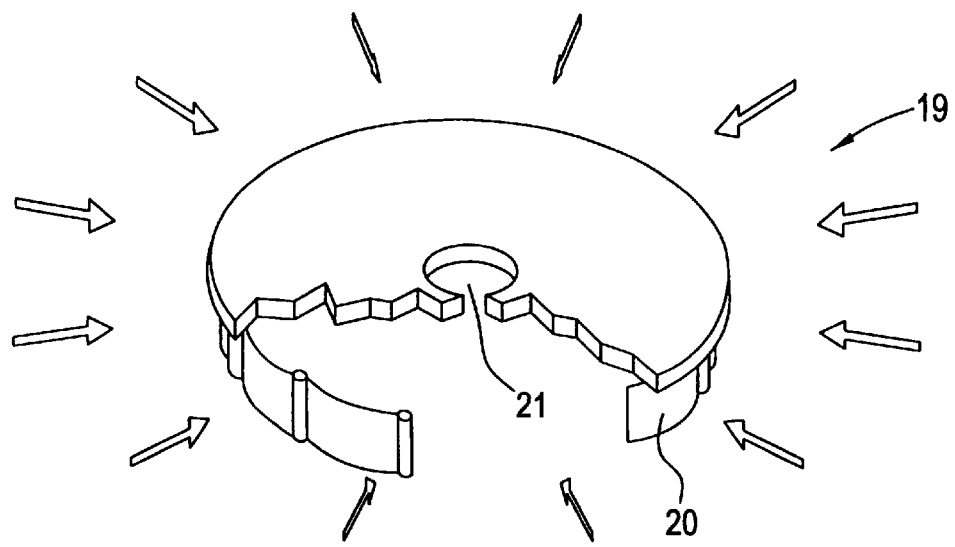

In FIG. 5, a clamp 19 for clamping the folded gas bag 15 together is shown. Segments 20, which overlap so that they move toward one another and thus narrow the inner diameter of clamp 19 when they are drawn together as indicated by the arrows in FIG. 5a (in this regard, see the broken-line representation in FIG. 5), are found on the clamp 19.

Figure 6:
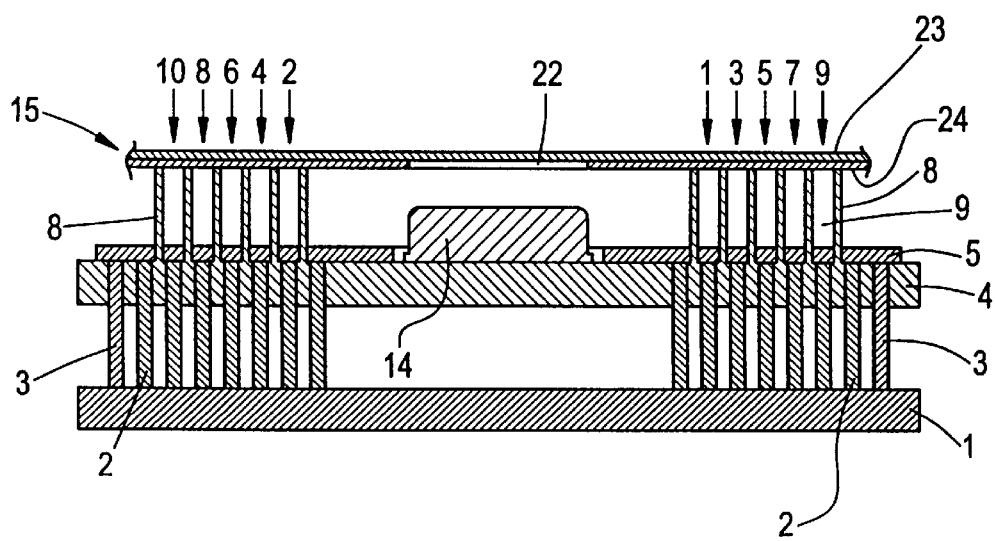
FIG. 6, is a cross-sectional representation of the folding tool of FIG. 1, with a gas bag laid thereon.

A folding process takes place as follows, with reference to the figures:

As shown in FIG. 6, the intermediate plate 4 is brought down toward the holding plate 1 in such a manner that the holding pins 2 pass through the perforations 6 of intermediate plate 4. Simultaneously, the form plate 5 is moved toward the intermediate plate 4 so that the spiral strip 8 passes through the spiral slot 10 and the folding tool 12 assumes a working position, as depicted in FIG. 2, so that the holding pins 2 also pass through the perforations 2.1. The intermediate plate 4 has a defined spacing from the holding plate 1 (maintained mechanically). The form plate 5 locks, preferably, with ends of the holding pins 2. By means of the attachment pins 3 the already-described adjustments of the plates 1, 4, 5 relative to one another are accomplished. The form plate 5 and the holding plate 1 are firmly connected to one another and spaced with respect to one another by the attachment pins 3 so that only the intermediate plate 4 can have guided movement. The gas bag 15 is placed at the middle of the form plate 5 so that a recess 22 of the gas bag 15 lies exposed to the gas generator 14, which is mounted in the middle of the folding tool 12. The gas bag 15 lies flat in double ply on an upper edge of the strip 8 that passes through the form plate 5. The folding aids 16, which are positioned for this purpose, act upon the gas bag 15 from above for the purpose of actual folding.

For this purpose, the folding aids 16 press the gas bag 15, beginning at a radially-interior area of the gas generator 14 and working outwardly along the strip 8, into a spiral depression. The spiral depression is defined by the surface of the form plate 5 and the free space 9 between the turnings, or windings, of the spiral strip 8. The gas bag 15, which includes an upper fabric layer 23 and a lower fabric layer 24, with the above-described recess 22, is folded gradually into the depression, in two ply, by the folding aids 16 in the form of a helix. The arrangement of folding aids 16 is adapted to this spiral form in the housing 18 so that the folding aids 16 are preferably arranged, from the inside to the outside, in resting position steps.

By these means, interior folding aids 16a are the first to engage the gas bag 15 and then the sequence denoted in FIG. 6 by small numerals 1' through 10' follows, until the entire gas bag 15 is folded and lying in the depression along the strip 8. In the process, the engagement of the folding aids 16 occurs at prescribed intervals of time, controlled by a program, for example, from the inside toward the outside, by means of a not-shown control apparatus, preferably, one after the other.

In order to avoid slippage of the gas bag 15 during folding, it is advantageous to leave the folding aids 16, from the inside toward the outside, at certain spacings in the depression with the gas bag 15.

A not-shown hold-down clamp at the middle of housing 18, at an appropriate time, lightly presses the middle of the two-ply gas bag 15 toward the gas generator 14.

Figure 7:
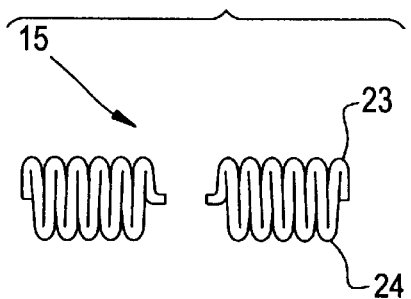
FIG. 7, is a cross-sectional view of the gas bag, in a folded form.
Figure 8:
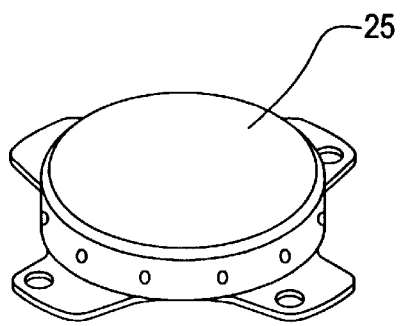
FIG. 8 is a prospective view of a housing for the folded gas bag.

After completion of the actual folding process, the folding aids 16 are removed from the depression into which the gas bag 15 is now folded. After removal of the folding aids 16, the clamp 19 is inverted, or placed, over the folded gas bag 15. At the same time, the intermediate plate 4 is moved to the top surface of holding plate 1 while the form plate 5 continues to be supported by the holding pins 2. As a result of removal of the spiral strip 8 from the spiral slot 10, the folded gas bag 15 remains behind on the form plate 5, without the gas generator 14 which is lowered as well by the adjustment of the intermediate plate 4. In order to bring the folded gas bag 15 (FIG. 7) to a desired shape, segments 20 of the clamp 19 are adjusted toward one another so that a centric compression of the gas bag 15 occurs. Furthermore, this gas bag 15, which is folded and compressed by the clamp 19, is placed in a housing 25 (FIG. 8). A stamp, not shown in greater detail, for the purpose of pressing the folded gas bag 15 into housing 25, is shoved through an opening 21.

It is self-evident that within the spirit and scope of the invention, changes are possible.

Thus, the gas generator 14 can be treated as a component of the folded gas bag 15, as the situation demands, and be simultaneously pressed into the housing 25. In addition, in lieu of the generator 14, another part having identical dimensions can be used.

In addition, the graduated folding aids 16 can engage the depression in one working step, without timed movements of the folding aids 16, with the folding aids 16 being preferably elastically mounted in the housing 18 by springs (not shown), so that first-engaging folding aids 16a can reduce in their working lengths (lengths of engagement) so that the spirally-arranged adjusted folding aids 16 fold in the depression at approximately the same time.

Because the gas bag is folded in an uninflated state, it is very easy to manage and fold using an automatic folding process.

Because of the spiral folded form into which the gas bag is brought, even when dual plies are present, a continual flow is assured when the gas bag is opened, so that even if gas suddenly flows in through a gas inlet in the gas bag, a necessary unfolding of the gas bag occurs.

A neat and continuous fold of the gas bag is achieved by a timed sequencing of the folding aids.

An escape of residual air found within the gas bag is possible without problem as folding occurs, through a gas inlet in the gas bag.

The invention claimed is:

1. An apparatus for folding an inflatable gas bag, said apparatus comprising a folding tool having:

a spiral strip (8) for defining between turns thereof a spiral free space (9) for receiving a gas bag in an uninflated, collapsed state so that it has a prescribed shape with lower and upper fabric layers of the gas bag being uniformly folded in two plies; and a folding aid (16) for fixing the gas bag at a center portion of the spiral strip and, starting from an imaginary center, pressing said gas bag into said spiral free space (9) for causing fold lines in said fabric layers progressively spiraling radially outwardly, out to an edge of the gas bag so that, along a horizontal plane, alternating areas between fold lines are made in said fabric layers which extend perpendicular to the horizontal plane.

2. The apparatus as in claim 1, wherein is further included a clamp (19) for being moved vertically onto the folding tool (12) and then for being moved horizontally to clamp the folded gas bag (15) upon removal of the folding tool (12) therefrom, the clamp (19) comprising segments (20) that overlap each other causing a centric compression of the gas bag (15) during clamping, and having an opening (21) for allowing passage of a stamp for forcing the folded gas bag (15) out of the clamp.

3. The apparatus as in claim 1, wherein: the folding tool (12) comprises a holding plate (1) having a holding-plate surface, with holding pins (2) and attachment pins (3) attached to the holding plate at the holding-plate surface and being arranged perpendicular to the holding-plate surface; an intermediate plate (4) with the spiral strip (8) attached in a spiral configuration to an intermediate-plate surface, said intermediate plate defining perforations (6, 7) for accepting the holding pins (2) and attachment pins (3); and a form plate (5) defining a spiral slot (10) corresponding in spiral shape to that of the strip (8), said form plate having perforations (11) to accept the attachment pins (3).

4. The apparatus as in claim 3, wherein the holding plate (1) and the form plate (5) are firmly connected to one another and kept at a distance from one another by the attachment pins (3), and wherein the intermediate plate (4) is positioned between the holding plate (1) and the form plate (5) so as to be movable therebetween.

5. The apparatus as in claim 1, wherein is further included a folding-aid plate attached to a folding-aid housing and a plurality of folding aids moveably extending from said housing through said plate for pressing said gas bag into said spiral free space, and wherein is further included a movement means for moving said folding aids (16) from the housing (18) dependent upon the spiral shape of the strip (8).

6. The apparatus as in claim 1, wherein there are a plurality of folding aids and wherein said folding aids (16) are arranged in a graduated length form with respect to each other in their rest position, from an inside position toward an outside position.

7. The apparatus as in claim 1, wherein there is a plurality of folding aids for pressing said gas bag into said spiral free space and wherein during folding, the folding aids (16) are left at certain distances in the depressions with the gas bag (15) from the inside to the outside.

8. A process for folding an inflatable gas bag comprising the steps of:

placing the gas bag in an approximately parallel plane on a folding tool in an uninflated state, collapsed in a volume-saving manner to a prescribed shape to have a prescribed volume with lower and upper fabric layers to be uniformly folded in two plies;

fixing the gas bag (15) at a center portion thereof and, starting from an imaginary center, causing a fold line in said fabric layers progressively spiraling radially outwardly, out to the edge of the gas bag (15) so that, perpendicular to the horizontal plane, alternating areas between folds are made in said fabric layers; and thereafter clamping the folds concentrically in the horizontal plane.

* * * * *